United States Patent [19]

Thayer

[11] 4,294,696
[45] Oct. 13, 1981

[54] SWING DIFFUSER

[75] Inventor: Paul M. Thayer, Shorewood, Wis.

[73] Assignee: Water Pollution Control Corporation, Milwaukee, Wis.

[21] Appl. No.: 115,470

[22] Filed: Jan. 25, 1980

[51] Int. Cl.³ ............................ C02F 3/20; B01F 3/04
[52] U.S. Cl. .................................. 210/220; 261/122; 261/DIG. 47
[58] Field of Search .................. 210/220, 221 R, 531; 261/122, DIG. 47

[56] References Cited

U.S. PATENT DOCUMENTS

| | | | |
|---|---|---|---|
| 2,144,385 | 1/1939 | Nordell | 210/220 X |
| 2,221,346 | 11/1940 | Durdin, Jr. | 210/220 X |
| 2,328,655 | 9/1943 | Lannert | 261/DIG. 47 |
| 2,650,810 | 9/1953 | Nordell | 210/220 X |
| 2,815,943 | 12/1957 | Lamb | 261/122 |
| 2,997,284 | 8/1961 | Nechine | 261/DIG. 47 |
| 3,008,492 | 11/1961 | Lannert | 261/DIG. 47 |
| 3,116,021 | 12/1963 | Born | 261/DIG. 47 |
| 3,160,685 | 12/1964 | Chase | 261/DIG. 47 |
| 3,174,733 | 3/1965 | Chase | 261/DIG. 47 |
| 3,339,901 | 9/1967 | Walker | 261/DIG. 47 |
| 3,864,441 | 2/1975 | Suzuki | 261/DIG. 47 |
| 3,989,627 | 11/1976 | Crandall | 210/220 |
| 4,048,267 | 9/1977 | Walker et al. | 261/122 |

FOREIGN PATENT DOCUMENTS

| | | | |
|---|---|---|---|
| 2838204 | 6/1979 | Fed. Rep. of Germany | 210/220 |
| 1271718 | 8/1961 | France | 261/122 |
| 52-64155 | 5/1977 | Japan | 210/220 |
| 6709487 | 1/1968 | Netherlands | 210/220 |

OTHER PUBLICATIONS

"Chicago" Swing Diffuser, Chicago Pump Co., Bulletin 175, 20 pages, 7/1938.

*Primary Examiner*—Robert H. Spitzer
*Attorney, Agent, or Firm*—Pollock, Vande Sande & Priddy

[57] ABSTRACT

A swing diffuser apparatus for gas diffuser systems for liquid treatment is disclosed in which an array of diffusers (50) is movable between a deeply submerged, essentially horizontal operating position, a shallowly submerged, essentially horizontal operating position, and a fully exposed, substantially upright position at the edge of the container for the liquid. An articulated hanger arm linkage (22, 24, 26, 30, 32, 52, 54) rotates the array to achieve these positions as the linkage folds and unfolds.

12 Claims, 8 Drawing Figures

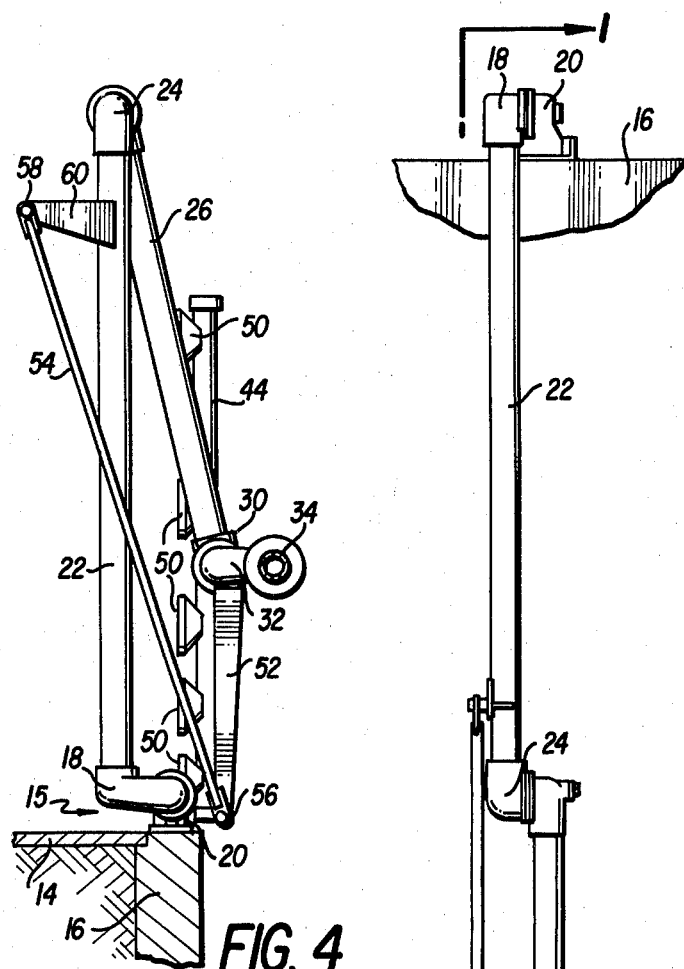
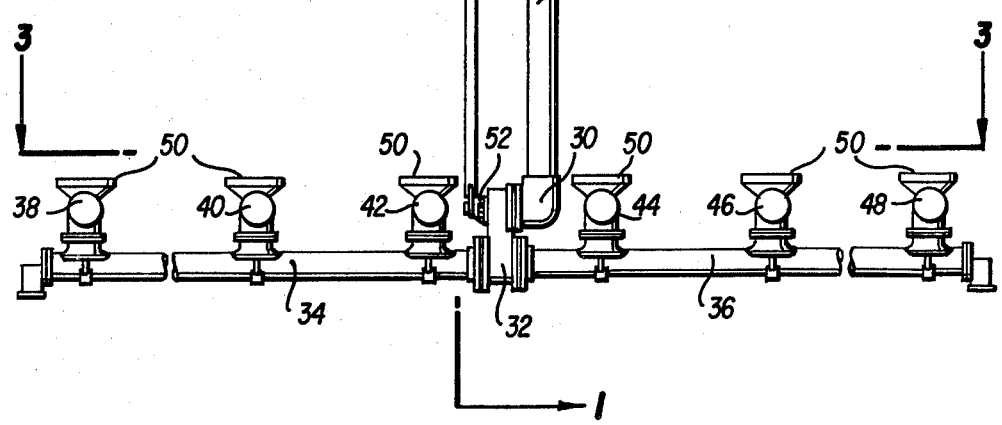
FIG. 2
FIG. 4

SWING DIFFUSER

DESCRIPTION

1. Technical Field

The present invention relates to liquid treatment systems of the type in which gas is passed through the liquid to modify it for subsequent uses, such as in sanitary sewage treatment systems where oxidative gases are diffused into waste liquids. Particularly, the invention concerns such systems in which an array of gas diffusers is submerged in the liquid during operation of the system. The array is positioned in the tank or vessel containing the liquid by an apparatus, mechanism or linkage which permits lifting the array from its submerged operating position to an open air servicing position adjacent to the side of the tank. The combination of such an apparatus and an array of diffusers has become known in the art as a "swing diffuser."

2. Background Art

Waste liquid treatment systems having various types of swing diffusers have been known since about the mid-1930's. One early sewage treatment apparatus comprised an array of diffusers connected to a pivot in the treatment tank at a location below the liquid surface, so that the array could be raised to a servicing position using a chain and sprocket mechanism. In the servicing position, the array extended over and at least partly blocked the walkway provided at the edge of the tank. A later, improved apparatus comprised an upper hanger pipe pivoted to an air supply main located on the coping at the edge of the tank above the liquid surface. A lower hanger pipe was pivoted to the lower end of the upper hanger pipe, and the diffuser array was rigidly secured to the lower end of the lower hanger pipe. This arrangement permitted movement of the array to a point at which it partly blocked the walkway and partly extended out over the tank, thus making servicing of some of the diffusers rather difficult. Complex systems of cables and guide tracks also have been used to raise and lower diffuser arrays.

Another effort to simplify diffuser servicing was made in which the array of diffusers attached to the swing linkage was asymmetrically, rigidly fixed to the lower hanger pipe so that more of the array extended over the walkway in the servicing position. Blocking of the walkway continued to be a problem. Swing diffusers with parallelogram linkages were tried to hold the diffuser array down against buoyant forces. In other diffuser swing mechanisms, a fixed upper hanger pipe was pivoted to a lower hanger pipe by a complex knee joint which remained submerged at the lower end of the upper hanger pipe when the array was raised for servicing.

Swing diffusers also were developed in which a flexible hose, supported by pivoted upper and lower hanger arms, was attached to a diffuser array rigidly connected to the lower hanger arm. In its raised position, the array remained nearly horizontal so that some diffuser units extended over the edge of the tank, thus making servicing difficult. Even until very recent years, swing diffuser mechanisms have continued to be installed in which pivoted upper and lower hanger arms supported a diffuser array rigidly attached to the lower hanger arm, so that the array remained horizontal and rather difficult to service in its raised position.

While such prior art devices have achieved a measure of success, a need has continued to exist for a swing diffuser which permits both ready access from the walkway to all of the diffuser units mounted in the diffuser array and ease of movement along the entire walkway itself, once the array has been raised to a servicing position adjacent the walkway. Such a system, if it could be devised, would enable the headers for the oxidative gas, the various control valves and the diffuser array to be serviced essentially simultaneously, without requiring service personnel to work on diffuser elements hanging over the open waste liquid tank or to work around portions of the swing linkage and/or diffuser array obstructing the walkway.

DISCLOSURE OF THE INVENTION

A primary object of the present invention is to provide an improved swing diffuser apparatus in which a large array of diffusers can be easily, safely moved to a servicing position at a location adjacent the edge of the waste liquid tank.

Another object of the invention is to provide such an apparatus in which the array of diffusers is oriented in the servicing position in an upwardly extending attitude adjacent the edge of the waste liquid tank, thus facilitating safe, effective maintenance of the diffusers making up the array.

A further object of the invention is to provide such an apparatus which permits the array to be oriented substantially horizontally in operating positions ranging from deeply to rather shallowly submerged positions below the surface of the waste liquid.

Yet another object of the invention is to provide such an apparatus in which stress levels in the arms comprising the apparatus can be conveniently maintained within desired limits.

These objects are given only by way of example. Thus, other desirable objectives and advantages inherently achieved by the disclosed invention may be apparent to those skilled in the art. Nonetheless, the scope of the invention is to be limited only by the appended claims.

In common with the prior art, the invention comprises a rigid upper hanger arm, an upper portion of which includes a pivot by which the arm may be secured to a fixed support, such as the edge of a tank of waste liquid. A rigid lower arm is also provided, and its upper portion is pivotally connected to the lower portion of the upper arm by a suitable joint so that the major portion or all of the lower arm folds toward the upper arm as the upper arm is raised about its pivot. According to the invention, an array of diffusers for oxidative gas is pivotally connected to a lower portion of the lower hanger arm, so that when the upper hanger arm is raised, the array can pivot from its essentially horizontal operating position to a substantially upright servicing position near the edge of the tank.

As used in this application, the term "upper hanger arm" refers to the hanger arm that is uppermost when the diffuser array is in its operating position below the surface of the waste liquid. Similarly, the term "lower hanger arm" refers to the hanger arm that is lowermost when the diffuser array is in its operating position. The diffuser arrays used in the invention typically extend over a considerable lateral area with a plurality of diffuser heads, plates or arms located in much the same plane or between two closely spaced essentially parallel planes, depending on the type of diffuser used. Thus, "substantially horizontal operating position" means that the array is oriented so that the oxidative gases are released into the waste liquid along a common substantially horizontal plane or between two closely spaced substantially horizontal planes. Of course, array orientations other than horizontal also may be used without departing from the scope of the invention. Similarly, "substantially upright" as applied to this servicing position of the array means that the latter is oriented in a plane or planes that are more nearly vertical than horizontal.

In one embodiment of the invention, means are provided for automatically rotating the diffuser array between its substantially horizontal operating position and its upwardly extending servicing position. This function preferably is achieved by a reach arm having one end portion pivoted to the array and another end portion pivoted to a point fixed relative to but movable with the upper hanger arm. The latter pivot, referred to as the upper reach arm pivot, can be supported or mounted directly or indirectly on the upper hanger arm, and can be offset to either side of the longitudinal axis of the upper hanger arm as necessary to ensure desired stress levels in the various arms; however, such pivot is typically positioned on the bisector of a chord line which connects the positions that are occupied by the lower reach arm pivot located at the other end portion of the reach arm, when the lower hanger arm is rotated through its desired arc of rotation relative to the upper hanger arm.

The diffuser arrays used in the invention can be symmetric or asymmetric about the pivot to the lower hanger arm, so that the arrays can be extended away from, but more preferably toward, the center of the liquid waste tank. The hanger arms preferably are rigid hollow pipes which serve as conduits for the oxidative gases; however, flexible tubing supported by rigid arms may also be used. By suitable choice of the lengths of the hanger arms, reach arm and a lever arm provided on the diffuser array, the array will assume a horizontal operating position at one, or more, or virtually any position(s) ranging from deeply to shallowly submerged locations below the surface of the waste liquid, as desired.

BRIEF DESCRIPTION OF THE DRAWINGS

FIG. 2 shows a front elevation view of the invention.

FIG. 4 shows a side elevation view, partially in section, of the embodiment of FIG. 1 when the swing diffuser has been raised to its substantially upright position for servicing.

FIG. 7 shows a modification of the embodiment of FIGS. 1–5, in which the upper reach arm pivot is offset to the opposite side of the upper hanger arm.

BEST MODE FOR CARRYING OUT THE INVENTION

Figure 1:
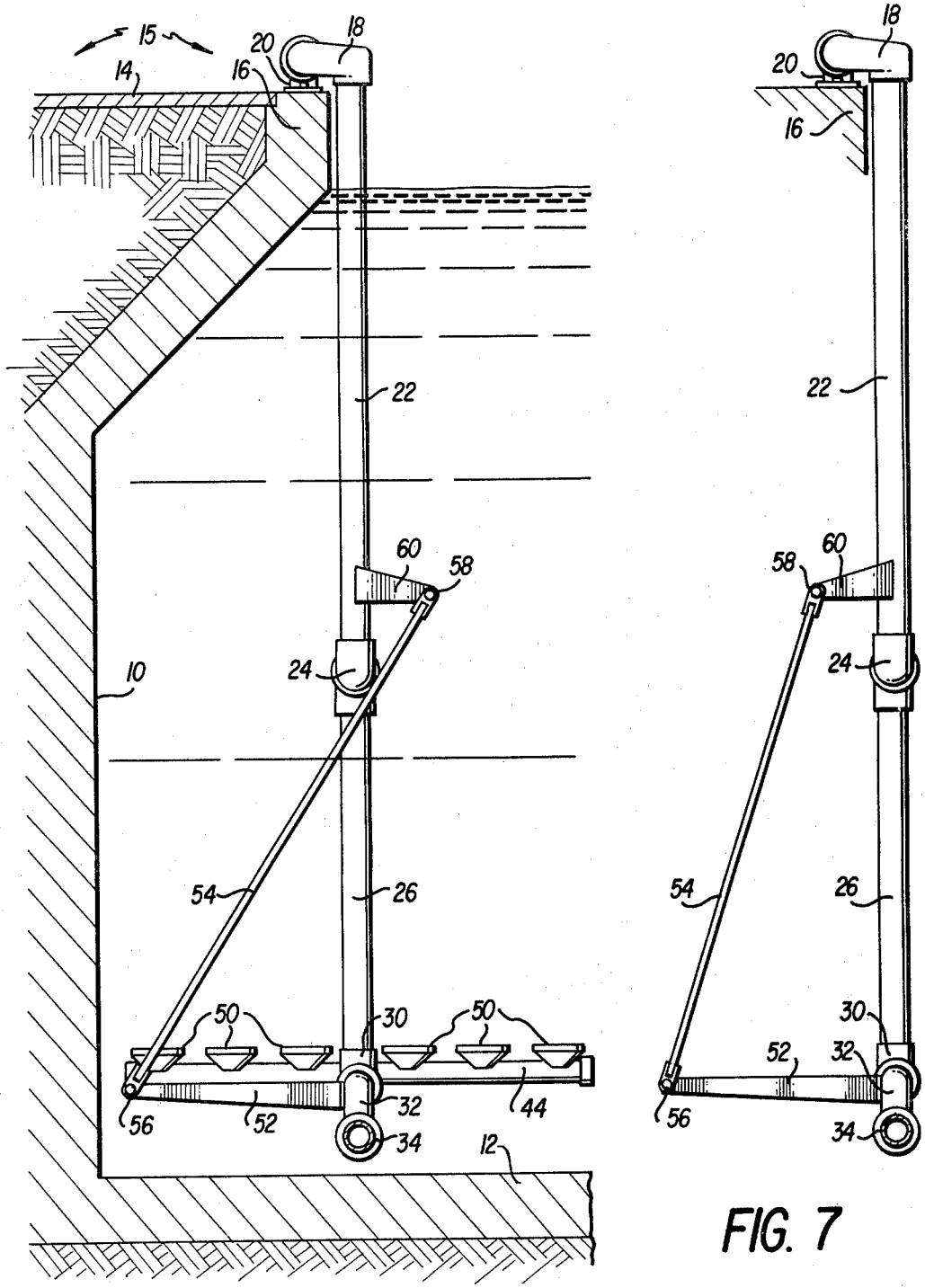
FIG. 1 shows a side elevation view, partially in section taken on line 1—1 of FIG. 2, of a swing diffuser apparatus according to the invention, as positioned deeply submerged in a waste liquid treatment tank.
Figure 3:
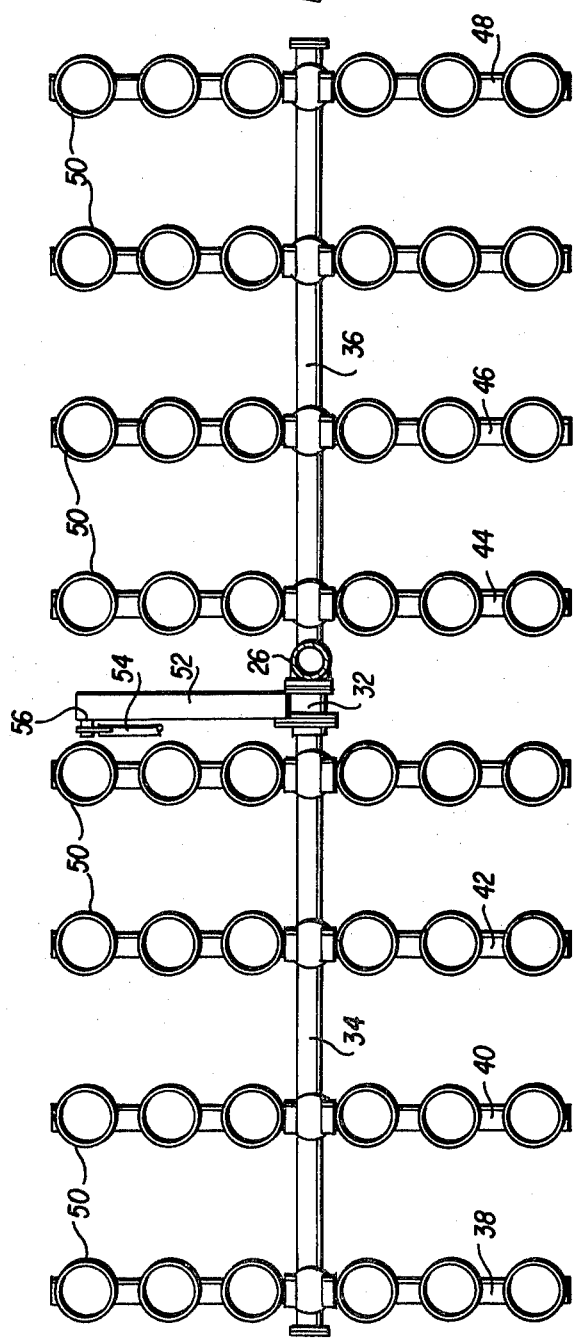
FIG. 3 shows a plan view of a diffuser array of one type suitable for use in the invention, taken along line 3—3 of FIG. 2.

In the following description, reference is made to the drawings, in which like reference numerals denote like elements of structure in each of the several Figures.

Referring to FIGS. 1 to 4, a portion of a wall 10 and the bottom 12 are illustrated fragmentally for a typical waste liquid treatment tank of the type in which the present invention is used. The upper end of wall 10 diverges into a conventional Y-shaped cross section within which headers for compressed air, not shown, are located. A grating 14 spans the top of the Y-wall to form a walkway 15 from which the treatment equipment can be serviced and observed. The coping 16 adjacent the walkway provides a convenient location for mounting the swing diffuser according to the invention. A hollow swing elbow 18 is pivotably mounted to a hollow stanchion or outlet 20 of conventional design, so that elbow 18 can pivot about stanchion 20 in an essentially vertical plane. A rigid tubular upper hanger arm 22 is attached to elbow 18 so that arm 22 extends downwardly into the treatment tank, as illustrated. A conventional hollow knee joint 24 pivotably connects arm 22 to a rigid tubular lower hanger arm 26 so that a major portion or all of lower arm 26 can be folded toward upper arm 22 and the two arms rotated upwardly to a collapsed position above coping 16, as shown in FIG. 4. All components are made from corrosion resistant material. Thus far described, the swing diffuser corresponds to prior art swing diffusers of the type previously mentioned. Although rigid, hollow arms are preferred both to carry the oxidative gas and to support the diffuser array, flexible tubing supported by rigid arms may also be used in the invention.

At the lower portion of arm 26, in this case at its lower end, a hollow swing elbow 30 is provided which is pivotably mounted to a hollow header connector 32, so that upper hanger arm 22 and header connector 32 have their longitudinal axes in a common vertical plane. A pair of hollow half-headers 34, 36 are rigidly connected to header connector 32 and extend laterally from the vertical plane of arm 22 and header connector 32. For balance, half-headers 34, 36 preferably are of equal length. A plurality of cross-headers 38 to 48 are mounted on top of half-headers 34, 36 and preferably at right angles thereto. An array of diffusers for oxidative gas is defined by a further plurality of individual plate diffuser assemblies 50 extending upwardly from half-headers 34, 36. Assemblies 50 preferably comprise diffusers of the type disclosed in U.S. Ser. No. 952,891, filed Oct. 19, 1978 by Lloyd Ewing, David T. Redmon, Paul M. Thayer, Frank L. Schmit and William H. Roche, for Sewage Aeration Systems, now abandoned, and also assigned to the assignee of the present application. However, those skilled in the art will appreciate that other types of diffusers could be used without departing from the scope of the present invention.

The use in a swing diffuser of numerous individual diffuser assemblies 50, some of which are located at a considerable distance from cross-headers 34, 36, is facilitated in the present invention since the array of diffusers can be pivoted to a substantially upright position convenient for servicing the diffuser assemblies. In prior art diffusers, elongated diffuser elements were used which connected to a header accessible from the walkway. Arrays of the present type presented maintenance problems since the outer diffuser assemblies could not be conveniently reached with the swing unit in the raised position. The diffuser array in the present invention, however, pivots about the lower portion of lower hanger arm 26. Conventional header stops or rests attached to the tank or supports on the outermost cross-headers, not shown, can be used to position the apparatus in the orientation shown in FIGS. 1 and 2. Alternatively, or in addition, the array can be weighted to retain it in its desired, substantially horizontal operating position at the bottom of the treatment tank.

Using conventional hoists (not shown) arms 22 and 26 are raised to the folded position above coping 16 as shown in FIG. 4. A lever arm 52 and reach arm 54 may be used to cause rotational movement of the diffuser array between its operating and servicing positions, during the raising of arms 22 and 26. Lever arm 52 is rigidly attached to header connector 32 and extends, in the illustrated embodiment, toward wall 10 of the treatment tank in a plane essentially parallel with the array. Of course, arm 52 need not be parallel with the array for the swing diffuser to function as indicated; however, the parallel arrangement is preferred due to its compact geometry. Or, arm 52 may comprise one of cross-headers 42, 44, suitably strengthened for the purpose, rather than a separate element as illustrated. Reach arm 54 is pivoted at its lower portion to the outer portion 56 of lever arm 52. The upper portion 58 of reach arm 54 is pivoted at a point fixed relative to but movable with upper hanger arm 22. In the illustrated embodiment, upper end 58 is pivoted at the end of an offset flange 60 rigidly attached to the lower portion of upper hanger arm 22.

According to the present invention, the diffuser array is movable from the deeply submerged substantially horizontal operating position shown in FIG. 1, through a succession of intermediate positions (not shown in FIGS. 1 to 4) to the substantially upright servicing position shown in FIG. 4. In the servicing position, the array preferably is oriented substantially upright, substantially at or above the level of the walkway and, as viewed in side elevation, positioned over or adjacent to the edge of walkway 15, so that the individual diffuser assemblies 50 all are readily accessible from walkway 15 without requiring service personnel to reach far out over the treatment tank; yet, hanger arms 22, 26 and reach arms 54 do not block passage on the walkway.

Figure 5:
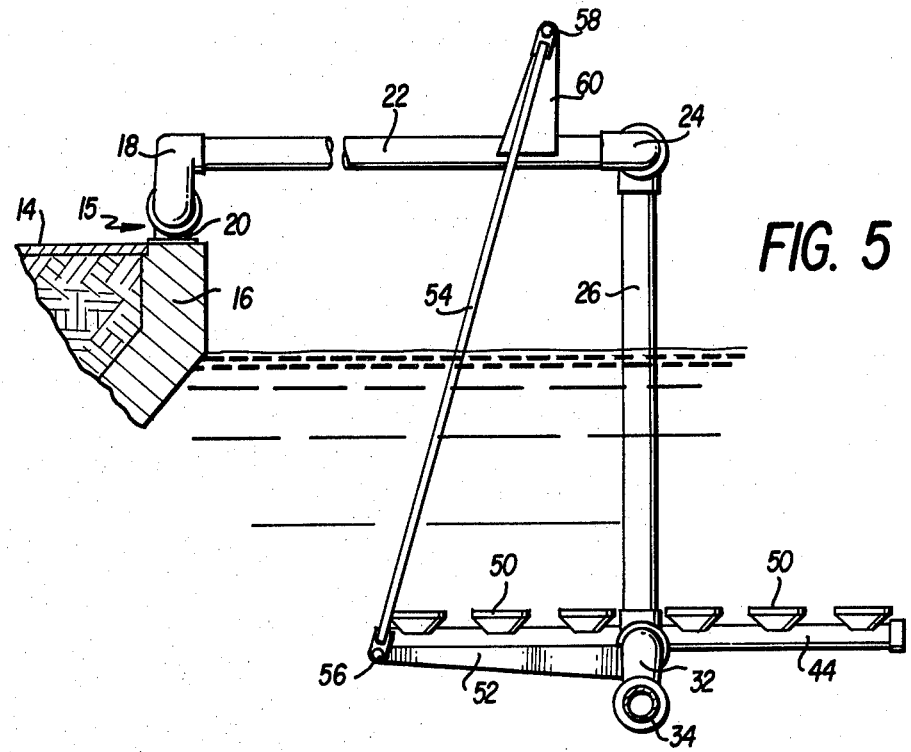
FIG. 5 shows a side elevation view, partially in section, of another swing diffuser apparatus according to the invention, as positioned shallowly submerged in a waste liquid treatment tank.

FIG. 5 illustrates another embodiment of the swing diffuser according to the invention in which the diffuser array is movable from a shallowly submerged substantially horizontal operating position as illustrated, to a substantially upright servicing position, such as shown in FIG. 4. The lengths and pivot points of the various arms and levers may require adjustment from those used for the embodiment of FIGS. 1 to 4, in order to provide a shallowly submerged substantially horizontal operating position; or, if desired, one set of arms and pivots can be used to facilitate movement from either the deeply or shallowly submerged operating position to the servicing position.

Figure 6:
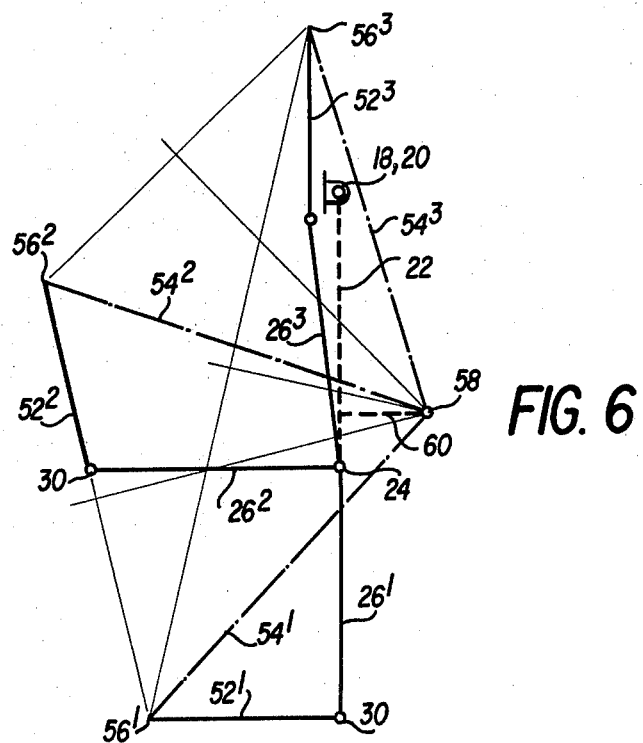
FIG. 6 shows schematically the manner in which the arm lengths and locations of the reach arm pivot points can be determined, based on three preselected desired positions for the diffuser array.

FIG. 6 illustrates schematically how the lengths of the various arms and the locations of their pivot points can be determined in accordance with the invention so that the operating position and the servicing position just described for the embodiment of FIGS. 1 to 4 can be achieved. The arms are illustrated by single line links and identified by the same reference numbers as in FIGS. 1 to 4, followed by the superscripts 1, 2 and 3 for the operating position, an intermediate position and the servicing position. Arm 22 is shown in dashed lines in FIG. 6 and for purposes of determining other link sizes and pivot points, arm 22 is considered to be stationary so that only movement relative to it need be considered. Its length preferably is chosen to be somewhat more than half the total length of arms 22 and 26 and the length of arm 26 is chosen so that in the servicing position, with the array oriented essentially vertically, the end of the array will clear the edge of coping 16. In the embodiment of FIGS. 1 to 4, as arm 26 moves relative to arm 22 from position $26^1$ to position $26^2$, lever arm 52 may allow the diffuser array to move to positions not so nearly perpendicular to arm 26, as shown only schematically at position $52^2$. Of course, other intermediate positions may be chosen, as desired. Finally, arm 52 should assume in position $52^3$ the orientation required to hold the diffuser array in the essentially vertical position shown in FIG. 4. To determine the pivot position of upper portion 58 of reach arm 54, two chord lines are drawn between the three positions occupied by outer portion 56 of lever arm 52. Perpendicular bisectors of these chord lines intersect at the pivot position for upper portion 58 to define the location at which reach arm 54 is pivoted to flange 60. A third chord line and bisector may be used as a check. Arm 54 is shown in each of its three positions by dot-dash lines, for completeness. As shown in FIG. 6, the pivot position of upper portion 58 will thus lie on the bisector of a chord line connecting the positions occupied by outer portion 56 when arm 26 is rotated through its normal arc of rotation relative to arm 22. The arm lengths and pivot locations for the embodiment of FIG. 5 may be determined identically, using the operating and servicing positions shown in FIG. 5 and a convenient intermediate position.

Since all components in the swing diffuser are made as light as practical to reduce weight and expense, care must be taken to minimize stress levels in the various arms. While the servicing and operating positions of the array in FIGS. 1 to 5 typically remain essentially the same in actual applications of the invention, the orientation of the array between the operating and servicing positions may not always be a matter of great concern, consistent with desired stress levels. Thus, point 58 can be moved relative to arm 22 and can be located on arm 22 or on the opposite side from the location shown in FIGS. 1 to 6, as illustrated for example in FIG. 7. Preferably, however, reach arm 54 will trail arm 26 as the apparatus swings upward so that flange 60 will remain reasonable in size and convenient in location, thus permitting a compact arrangement in the servicing position.

Figure 8:
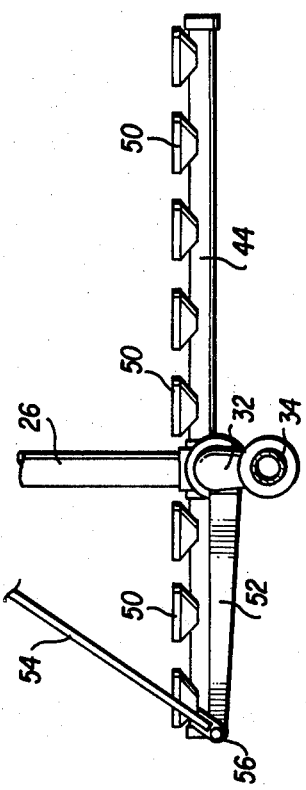
FIG. 8 shows another modification of the embodiment of FIG. 1, in which the diffuser array is asymmetrical about its pivot to the lower hanger arm.

FIGS. 1 to 5 show a swing diffuser in which the diffuser array is arranged symmetrically about the longitudinal axis of upper hanger arm 22. While this arrangement has the advantage that buoyant forces in the operating positions do not develop much of a moment about knee joint 24, it is also within the scope of the invention to use asymmetric diffuser arrays such as shown in FIG. 8. There, the array extends further toward the center of the treatment tank which is desirable in some applications, as will be understood by those skilled in the art. The size and location of the various arms and levers are determined in such an asymmetric embodiment just as for the symmetric embodiment.

The various components of the swing diffuser according to the present invention will take on differing dimensions depending on the depth of the treatment tank, the depth at which the diffusers are to operate, the type of diffuser used, the desired flow rate for the oxidative gas and related factors. In one embodiment using fine bubble ceramic plate grids of the type disclosed in Ser. No. 952,891, upper hanger arm 22 was ten feet long; lower hanger pipe 26, six feet nine inches long; offset flange 60, one foot three inches long and one foot four inches above knee joint 24; lever arm 52, three feet ten inches long; and reach arm 54, nine feet seven inches long. This set of lengths provided acceptable stress levels in the various components for a swing diffuser whose normal operating position for the diffuser array was a deeply submerged, essentially horizontal orientation at or near the bottom of the treatment tank, as shown in FIGS. 1 to 4. On the other hand, where the normal operating position for the diffuser array was a shallowly submerged essentially horizontal orientation just below the surface of the waste liquid as shown in FIG. 5, reach arm 54 was shortened to eight feet ten inches and offset flange 60 was lengthened to one foot eleven inches at two feet one-half inch above knee joint 24. As indicated in the discussion of FIG. 6, one set of arm lengths and pivot locations also can be derived to serve both the deeply and shallowly submerged operating positions.

INDUSTRIAL APPLICABILITY

The invention is intended primarily for use in waste liquid treatment systems of the type used to treat sanitary sewer effluents. However, the swing diffuser apparatus also can be used in other applications where a submerged array of diffusers is required to force a reactive gas through a surrounding liquid medium.

Having described my invention in sufficient detail to enable those skilled in the art to make and use it, I claim:

1. A swing diffuser apparatus for gas diffuser systems of the type in which diffusers are submerged in a tank of liquids to be treated, said apparatus comprising:
   a rigid upper hanger arm;
   means for pivoting said upper hanger arm to or adjacent to said tank for movement in a generally upright plane;
   a rigid lower hanger arm;
   means for pivoting said lower arm to said upper arm for movement in said generally upright plane or a parallel plane;
   an array of gas diffusers pivotably connected to the lower portion of said lower hanger arm, said array having a substantially horizontal operating position when submerged in said liquids; and
   means cooperating with said upper hanger arm and said diffuser array for rotating said diffuser array from said substantially horizontal position to an upwardly extending servicing position above the surface of said liquids at the side of said tank, said rotating occurring as said upper hanger arm is pivoted to a servicing position extending upwardly from said means for pivoting said upper hanger arm.

2. Apparatus according to claim 1, wherein said means for rotating comprises a lever arm in or attached to said array and a reach arm having a first portion pivoted to said lever arm and a second portion pivoted at a point fixed relative to but movable with said upper hanger arm.

3. Apparatus according to claim 2, wherein said lever arm extends in trailing relationship relative to the direction of movement of said lower hanger arm as said lower hanger arm pivots toward said upper hanger arm.

4. Apparatus according to claim 2, wherein said second portion is pivoted at a point positioned on the bisector of a chord line connecting the positions occupied by the pivot of said first portion when said lower hanger arm is rotated through its normal arc of rotation relative to said upper hanger arm.

5. Apparatus according to claim 2, wherein said pivot point is offset relative to the axis of said upper hanger arm.

6. Apparatus according to claim 5, wherein said pivot point is offset on the leading side of said upper hanger arm.

7. Apparatus according to claim 5, wherein said pivot point is offset on the trailing side of said upper hanger arm.

8. Apparatus according to claim 2, wherein said reach arm is pivoted between said lever arm and said upper hanger arm so that said array assumes either deeply or shallowly submerged substantially horizontal operating positions.

9. Apparatus according to claim 1, wherein said array comprises an elongated air header extending essentially perpendicular to said upright plane and a plurality of cross-headers extending laterally across said air header, said cross-headers carrying a plurality of plate-type diffusers; and the pivot axes are mutually parallel between said upper hanger arm and said tank, said upper hanger arm and said lower hanger arm, and said lower hanger arm and said array.

10. Apparatus according to claim 1, wherein said array is arranged symmetrically about its pivot to said lower hanger arm.

11. Apparatus according to claim 1, wherein said upper and lower hanger arms are gas supply conduits for said array.

12. Apparatus according to claim 1, wherein said array is arranged asymmetrically about its pivot to said lower hanger arm, with a greater portion thereof extending toward the center of the tank than toward the wall of the tank.

* * * * *